Jan. 6, 1942.  R. PARTEN ET AL  2,268,958
LUGGAGE CARRIER
Filed April 24, 1939   2 Sheets-Sheet 2
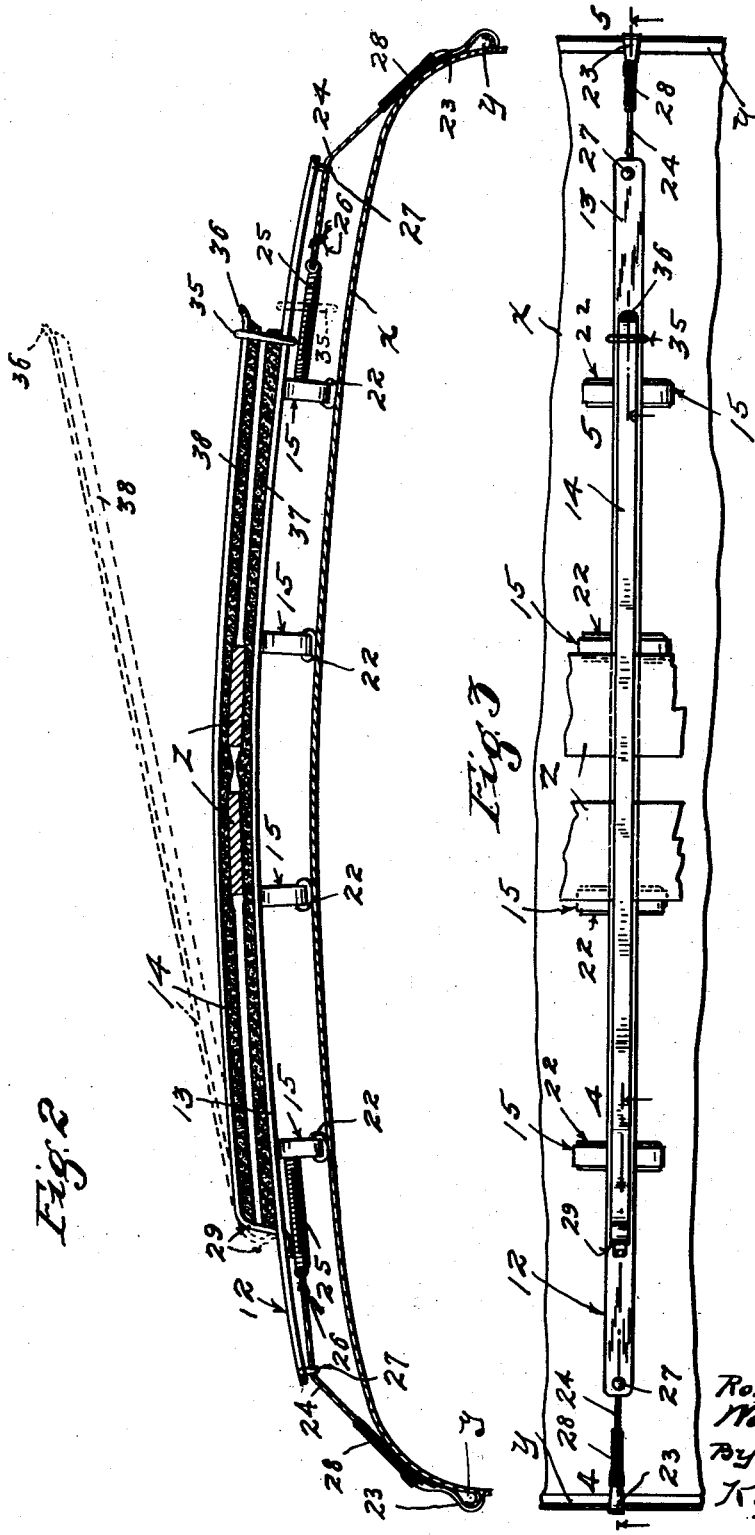
INVENTORS
Robert Parten
Ward M. Parten
By their Attorneys
Kilgore & Kilgore Patented Jan. 6, 1942

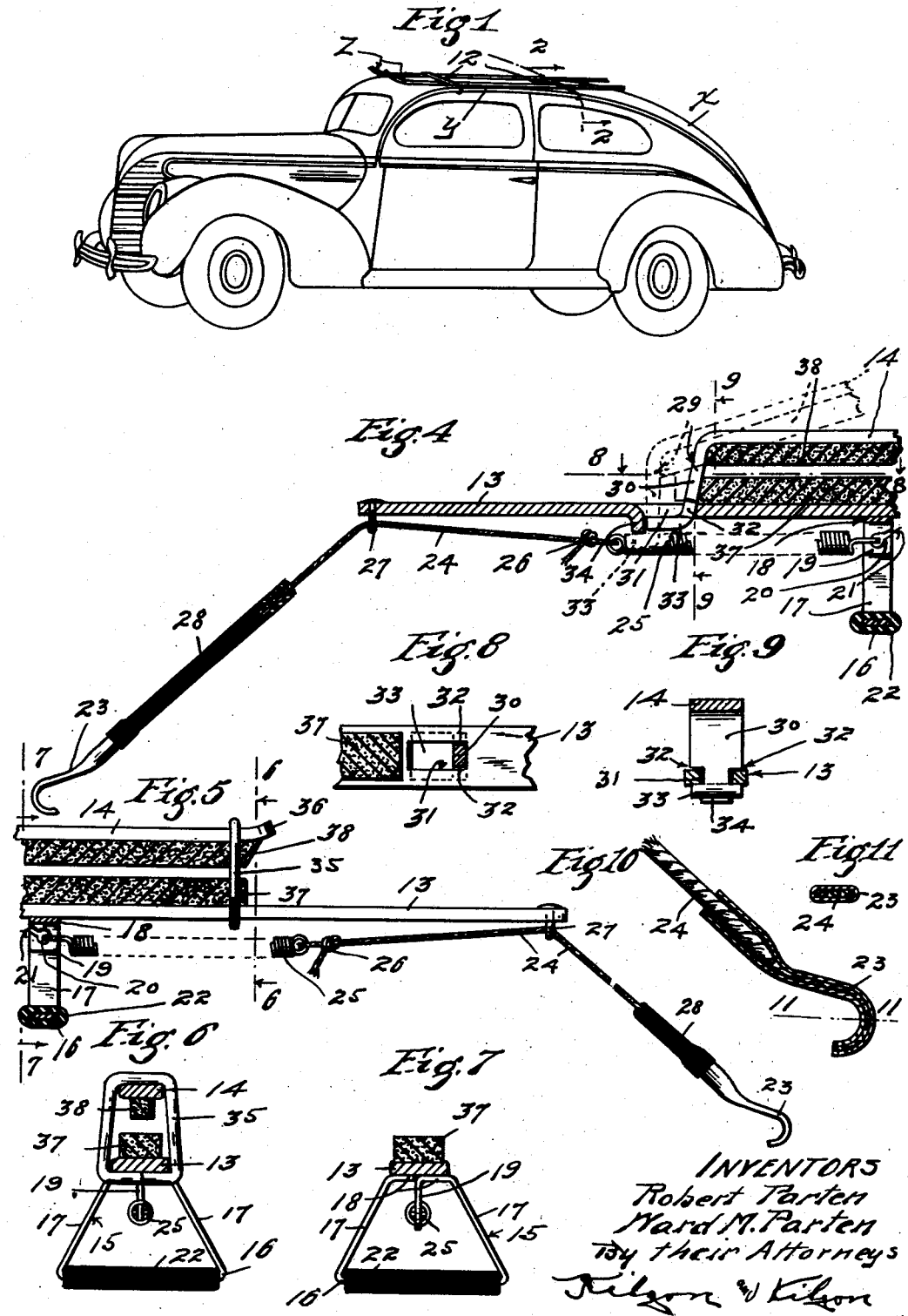

2,268,958

UNITED STATES PATENT OFFICE 2,268,958

LUGGAGE CARRIER

Robert Parten, Minneapolis, and Ward M. Parten, Wayzata, Minn.

Application April 24, 1939, Serial No. 269,672

2 Claims. (Cl. 224—29)

Our invention relates to improvements in luggage carriers intended for general use but especially well adapted to be mounted on the top of an automobile and used in pairs for holding skis, toboggans, fish poles, surveying instruments or similar objects that are too long to be conveniently carried inside an automobile, especially when all of the seats are occupied.

The objects of the invention are to provide a simple and efficient luggage carrier in the form of a clamp that may be placed transversely over the top of an automobile and removably and yieldingly secured thereto by fastening devices that are applicable to the rain gutters on the sides of the automobile.

The invention further provides a luggage carrier in which objects are yieldingly held and in which said carrier may be easily manipulated from one side of an automobile while securing an object or objects therein or removing the same therefrom.

Said invention further provides a luggage carrier that may be manually adjusted to automobiles of different widths or that will automatically adjust itself thereto. The improved luggage carrier is further provided with means for holding the same open and in a position such that it can be easily closed.

Other objects of the invention will be apparent from the following description, reference being had to the accompanying drawings.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view showing, in diagram, an automobile having two of the improved luggage carriers mounted on the top thereof and holding a pair of skis;

Fig. 2 is a view partly in elevation and partly in section, taken on the line 2—2 of Fig. 1 on an enlarged scale, and also showing some parts in different positions by means of broken lines;

Fig. 3 is a fragmentary plan view of the parts shown in Fig. 2;

Figs. 4 and 5 are views partly in elevation and partly in section taken on the lines 4—4 and 5—5 of Fig. 3 respectively, on an enlarged scale;

Figs. 6 and 7 are fragmentary detail views partly in section, taken on the lines 6—6 and 7—7 of Fig. 5;

Fig. 8 is a fragmentary detail view partly in plan and partly in section taken on the irregular line 8—8 of Fig. 4;

Fig. 9 is a detail view in section taken on the irregular line 9—9 of Fig. 4;

Fig. 10 is a detail view partly in elevation and partly in longitudinal central section showing one of the rain gutter engaging hooks, on an enlarged scale; and Fig. 11 is a detail view in section taken on the line 11 of Fig. 10.

For the purpose of showing the invention applied in working position, two of the improved luggage carriers 12 are mounted on the top of an automobile, indicated as an entirety by the letter X with the exception of its rain gutters Y which extend along the sides of the automobile just above the door openings. A pair of skis Z are shown held by the luggage carriers 12 on the top of the automobile X and longitudinally thereof.

The improved luggage carrier 12 is in the form of a clamp and includes a relatively fixed lower or base member 13 and a relatively movable upper or hinged member 14.

Both members 13 and 14 are in the form of flat bars that may be readily sprung to fit the curvature of the top of the automobile X.

The lower bar 13 is provided with a plurality of feet 15, as shown four, which rest on the top of the automobile and support the luggage carrier 12 transversely thereof and thereabove. Each foot 15 is in the form of a single flat strip of metal bent to form a bottom member 16, a pair of upwardly and inwardly converging side members 17 and top members 18 which extend transversely under the lower bar 14 and are spot welded thereto. An anchor 19 for a spring is formed on each of the two outermost feet 15 by bending the free end portion of one of the top members 18 downwardly midway between the sides of the members 16.

This anchor 19 extends edgewise longitudinally of the lower bar 13 at the transverse center thereof and is provided with a transverse hole 20 and an entrance passageway 21 which extends from the rear edge of said anchor into the hole 20. To prevent the feet 15 from marring the finish on the automobile X, a pure gum rubber tube 22 is telescoped onto each member 16. This tubing 22 will not stick to the finish of the automobile X and will not leave a mark thereon.

To detachably secure the luggage carrier 12 to the automobile X there is provided at each end of the lower bar 13 an anchoring device comprising a hook 23, a woven wire cable 24, and a coiled spring 25. The hook 23 is adapted to be hooked under one of the rain gutters Y. The spring 25 is attached to the anchor 19 by inserting the loop on one of its ends into the hole 20 through the passageway 21. One end of the cable 24 is attached to the other end of the spring 25 by inserting the same through the respective loop and tying a knot 26 therein. It may be here stated that the hook 23 is formed of a metal tube flattened in part and bent to form said hook.

This hook 23 is attached to the other or outer end of the cable 24 by inserting said cable therethrough and pinching the same therein by flattening and bending said tube during the formation of said hook. The cable 24 at its intermediate portion works through a guide eye 27 secured to the respective end of the bar 13. To prevent the cable 24 and the hook 25 from marring the finish on the automobile X, a rubber tube 28 is telescoped over the outer end portion of said cable and the inner end portion of said hook.

The top bar 14 is attached to the lower bar 13 by a separable hinge 29. This hinge 29 is formed by bending the respective end of the top bar 14 downwardly to form a hinged member 30 and in forming an elongated aperture 31 in the bar 13. The hinge member 30 extends through the aperture 31 which is somewhat narrower than said hinge member which has in its edges notches 32 into which the longitudinal edges of the bar 13, at the aperture 31, extend and thereby hingedly connect the bar 14 to the bar 13 with freedom for a relative short endwise movement. The end portion of the hinge member 30, below the notches 32, is bent outwardly under the bar 13 to afford a stop member 33 which normally engages the bar 13, at its under side, and tends to hold the bar 14 parallel to the bar 13.

In forming the aperture 31, a portion of the stock cut from the bar 13 is bent downwardly to form an abutment 34 at the outer end of said aperture. When the bar 14 is closed the stop member 33 engages the abutment 34 and positions the hinge member 30 against the bar 13 at the inner end of the aperture 31 and thereby holds the bar 14 against relative endwise movement.

In raising the bar 14 to open the clamp 12 the stop member 33 will be moved below the abutment 34, when said bar reaches a predetermined inclination, and thereby permit the bar 14 to be moved endwise rearwardly until stopped by the engagement of the hinge member 30 with the abutment 34. This endwise movement of the bar 14 relative to the bar 13 positions the stop member 33 under the abutment 34 and thereby holds the bar 14 raised as shown by broken lines in Figs. 2 and 4.

The bar 14 at its free end is held in an operative or clamping position by means of a loop like latch 35 that encircles both bars 13 and 14. This latch 35 is free to slide on the bar 13 and from the bar 14 to release said bar 14 and permit the same to be opened. To prevent the latch 35 from accidentally sliding from the bar 14 and thereby release the same, the free end portion of the bar 14 is turned upwardly as indicated at 36. The cable 24 and the spring 25, at the free end of the bar 14, prevent the latch 35 from being removed or lost from the bar 13. It will be noted that the end portions of the bar 13 project outwardly of the ends of the bar 14.

Two strips of sponge rubber 37 and 38 are cemented, the former to the upper face of the bar 13 and the latter to the under face of the bar 14. These rubber strips, 37 and 38, extend the full distance between the hinge member 30 and the latch 35.

When the bar 14 is closed the opposing faces of the rubber strips extend substantially parallel to each other and are spaced the one from the other.

In applying one of the improved luggage carriers 12 to the automobile X the same is placed transversely across the top thereof, with the feet resting thereon. The hook 23 at the hinged end of the bar 14 is then interlocked with the respective rain gutter Y. Next the hook 23, at the free end of the bar 14, is interlocked with the respective rain gutter Y which necessitates the stretch of the springs 25. The operative length of one or both of the cables 24 may be varied at will by changing the knot or knots therein. The first time the luggage carrier is applied to an automobile one or both of the cables 24 may be adjusted to the width of the respective automobile and thereafter the springs 25 will automatically take care of any adjustment between the carrier 12 and the hooks 23. The operative lengths of the cables 24 must be such that a stretching of the springs 25 will be required to interlock the hooks 23 with the rain gutters Y and yieldingly hold the same in position on the automobile.

Any surplus in the length of the cables 24 outwardly of the knots 26 may be cut away.

In stretching the springs 25 to interlock the second hook 23 with one of the rain gutters Y, the bar 13 will be sprung to follow the contours of the top of the automobile and bring all of the feet 16 into contact with said top.

To hold the skis Z or other objects on the top of an automobile, by means of the two luggage carriers 12, the bars 14 are opened, as shown, by broken lines in Fig. 2 and thus held as previously described. The skis Z are then positioned longitudinally of the automobile and transversely on the strips of sponge rubber 37. With the skis X in position, the bar 14 of each clamp is given a slight forward endwise movement relative to the bar 13 to release the stop member 33 from the abutment 34 and permit the bar 14 to be lowered and position its sponge rubber strip 38 on the skis Z. A downward pressure on the free end of one of the bars 14 will compress the opposing rubber strips 37 and 38 and thereby yieldingly hold the skis Z. While the free end of the bar 14 is being held down, the latch 35 may be moved over the upturned end 36 on the bar 14 and into an operative position on said bar. See Fig. 5. During the closing of the bar 14, to clamp the rubber strips 37 and 38 onto the skis Z, said bar will be sprung and substantially follows the contour of the bar 13. Obviously, the yielding action of the tensioned springs 25 will prevent each of the luggage carriers from working loose from the automobile X or more relative thereto under the movement of said automobile. The compressed rubber strips 37 and 38 prevent the skis Z from moving relative to each luggage carrier 12 under the moving action of the automobile.

It is evident that by standing on the running boards of the automobile X the hooks 23 may be easily manipulated to interlock the same with the rain gutters Y or to release the same therefrom. It is also evident that by standing on one of the running boards of the automobile X the bar 14 may be easily reached and lifted into an open position or closed and while thus standing, skis or other objects may be placed in the luggage carrier 12 or removed therefrom.

In assembling the improved luggage carrier 12 it is only necessary, in connecting the bar 13 to the bar 14 to position the bar 14 at right angles to the bar 13, insert the stop member 33 and hinge member 30 into the aperture 31 until the notches 32 are aligned with the bar 13, turn the bar 14 into the plane of the bar 13 to carry the notches 32 into interlocking engagement with the bar 13, and finally in folding the bar 14 into an operative position over the bar 13.

The drawings illustrate a commercial form of the invention, but it will be understood that the same is capable of certain modifications as to details of construction, arrangement and combination of parts within the scope of the invention herein disclosed.

What we claim is:

1. A device of the kind described comprising a lower spring metal clamping bar and a cooperating upper spring metal clamping bar, said lower clamping bar having feet for supporting the device on the top of an automobile transversely thereof, the end portions of the lower clamping bar extending outwardly of the two outermost feet, which are primarily held by the lower clamping bar above and out of contact with the top of the automobile, means attached to the outer ends of the lower clamping bar by which said bar may be bowed to bring the two outermost feet onto the top of the automobile and then attached to the automobile for anchoring the device thereto and thereby holding the lower clamping bar bowed with the feet yieldingly pressed onto the top of the automobile, and means connecting the two clamping bars to permit lost motion therebetween during bending thereof.

2. The structure defined in claim 1 in which said means includes hooks constructed and arranged to be interlocked with parts of the automobile and held operative by the tension of the bowed lower clamping bar.

ROBERT PARTEN.
WARD M. PARTEN.